United States Patent

[11] 3,590,299

| [72] | Inventors | Peter Kenneth Clifford Wiggs<br>Tadworth;<br>Kelvin Golden Hughes, Kenton, Harrow,<br>both of, England |
|---|---|---|
| [21] | Appl. No. | 822,352 |
| [22] | Filed | May 7, 1969 |
| [45] | Patented | June 29, 1971 |
| [73] | Assignee | Morganite Carbon Limited<br>London, England |
| [32] | Priority | May 15, 1968 |
| [33] | | Great Britain |
| [31] | | 23148/68 |

[54] BRUSH ARRANGEMENT FOR DYNAMO ELECTRIC MACHINES
8 Claims, 3 Drawing Figs.

[52] U.S. Cl.................................................. 310/246, 310/248
[51] Int. Cl................................................H02k 13/00
[50] Field of Search........................................... 310/239, 242, 245, 246, 247

[56] References Cited
UNITED STATES PATENTS
2,695,968 11/1954 Welch et al.................. 310/246
2,520,379 8/1950 Ward..... ....... ....... 310/246
2,706,261 4/1955 Burchfield................. 310/246

Primary Examiner—Milton O. Hirshifield
Assistant Examiner—R. Skudy
Attorney—Larson & Taylor ABSTRACT: The invention relates to a brush arrangement for a dynamoelectric machine. The brush arrangement includes a brush box having a brush locating surface, a split brush having a first brush portion adjacent the locating surface and a second brush portion remote from the locating surface. The split brush has a bevelled outer end. According to the invention, a pressure plate is secured on the bevelled outer end of the remote brush portion. The plate has a first extension overlying the bevelled outer end of the adjacent brush portion and a second extension which projects as a cantilever from the restore brush portion in a direction away from the adjacent brush portion. The arrangement includes a pressing device engaging the second extension of the plate. In this arrangement, the adjacent and remote portions of the split brush are maintained together and the adjacent portion is maintained against the locating surface of the brush box. In addition, the inner ends of the brush portions are kept together irrespective of the direction of rotation of the collector ring.

PATENTED JUN 29 1971 3,590,299

BRUSH ARRANGEMENT FOR DYNAMO ELECTRIC MACHINES

This invention comprises improvements in or relating to brush arrangements of dynamoelectric machines, particularly high speed motors, that is motors in which the peripheral speed of the commutator past the brush is of the order of 4500 ft./min. or more, and has for object improving the utility of brush arrangements.

Any brush arrangement of a dynamoelectric machine comprises a brush holder including a brush box receiving the brush and further including a pressing device which acts on the outer end of the brush to urge it into contact with the commutator or slipring of the dynamoelectric machine. In order to improve stability of the brush in the brush box, the outer end of the brush is sometimes bevelled so that the pressure applied by the pressing device not only has a component parallel to the lengthwise axis of the brush urging it towards the commutator or slipring, but also a transverse component urging the brush in the tangential direction, that is parallel to the direction of the frictional forces on the brush due to its contact with the commutator or slipring, towards a face of the brush box referred to as the locating surface. When split brushes are used, the plane of division is parallel to this locating surface so that the brush has a portion which is in contact with the locating surface and which may be referred to as the "adjacent brush portion," and a portion which is remote from the locating surface and which may be referred to as the "remote brush portion."

One improvement of this invention relates to a brush arrangement, herein referred to as the class specified, using a split brush having a bevelled outer end to produce such a transverse component of pressure.

According to this improvement, the remote brush portion has a pressure plate secured on its outer end to be contacted by the pressing device, the plate having a first extension to overlie the outer end of the adjacent brush portion and a second extension which projects cantileverwise from the remote brush portion in a direction away from the adjacent brush portion, the plate and its extensions being such that in use both lengthwise and transverse components of the pressure will be applied to both brush portions.

By adopting this improvement, it can be ensured that there is adequate force to maintain the adjacent brush portion against the locating surface and to keep together the inner ends of the two portions, that is the ends which contact the commutator or slipring, irrespective of the direction of rotation of the commutator or slipring.

According to another improvement, a brush arrangement of a dynamoelectric machine has a brush box for a split brush so constructed that in use the lengthwise axis of a brush accommodated therein will make an angle of about 22½° with the radius of the commutator or slipring through the point of intersection of the lengthwise axis with the surface of the commutator or slipring, and further so constructed to receive a constant force pressing device of the self-recoiling spring-type.

A transverse displacement of the coil of the spring may be achieved by having the unwound end portion of the recoiling spring lying against a surface which converges with the lengthwise axis of the brush in a direction towards the collector end of the brush box.

Such brush arrangements can be used for reversible machines without the well-known disadvantages of radial brushes arising.

The accompanying drawings illustrate constructions embodying the above improvements, and in these drawings.

Figure 1:
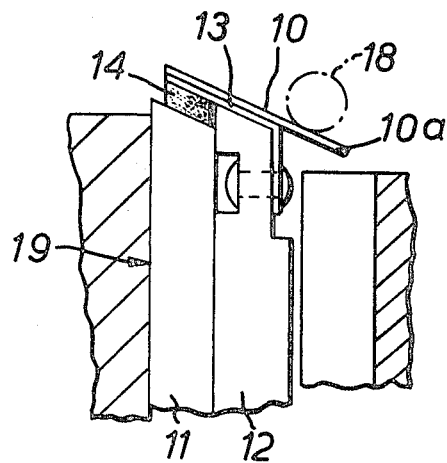
FIG. 1 shows a first form of split brush.

In the construction according to FIG. 1, the plate 10 is plane where it overlies the bevelled ends of the adjacent and remote brush portions 11, 12, respectively, has a limb, for instance formed by one web of a welded-on angle piece 13, riveted to the remote brush portion 12, and has a cantilever extension 10a away from the adjacent brush portion 11 to be engaged by pressing device 18.

Figure 2:
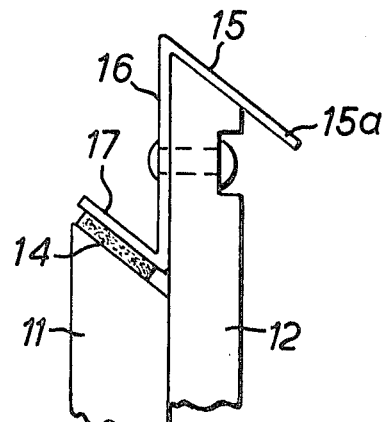
FIG. 2 shows a second form of split brush.

In a second construction according to FIG. 2, the plate has a zigzag shape. The plate has one end limb 15 overlying the end of the remote brush portion 12, this limb having a cantilever extension 15a for engagement of the pressing device, a central web 16 riveted to the remote brush portion 12, and an end limb 17 which is oppositely directed and roughly parallel to the limb 15 overlying the outer end of the adjacent brush portion 11.

In both constructions a pad 14 of elastomeric material, e.g. rubber, is interposed between the plate and the adjacent brush portion 11, but if desired the plate may bear directly on the end of this brush portion.

An important advantage of these arrangements is that the transverse component of the pressure applied by the pressing device 18 always acts to press the remote brush portion 12 on to the adjacent brush portion 11 and the latter against the locating surface 19, even when in operation any momentary disturbance of the remote brush portion causes it to move from contact with the commutator or slipring which movement would also tend to lift the plate end contact with the adjacent brush portion 11. Therefore each brush portion is always under control of loads opposing free movement and this improves operation of the brush arrangement.

The provision of the elastomeric pad 14 as described has the effect of permitting a small relative lengthwise displacement of the brush portions 11, 12 without complete removal of the lengthwise pressure component urging the adjacent brush portion 11 towards the collector. This degree of freedom of the brush portions for relative movement assists in achieving a good brush performance.

The arrangement of FIG. 2 also has the advantage that the adjacent brush portion 11 can be substantially shorter in length than is necessary with the arrangement of FIG. 1 and known brush arrangements in which a plate or cap is secured on the adjacent brush portion, so that less wastage of brush material occurs when replacing a brush.

This improvement is also applicable to brushes split into more than two portions.

Figure 3:
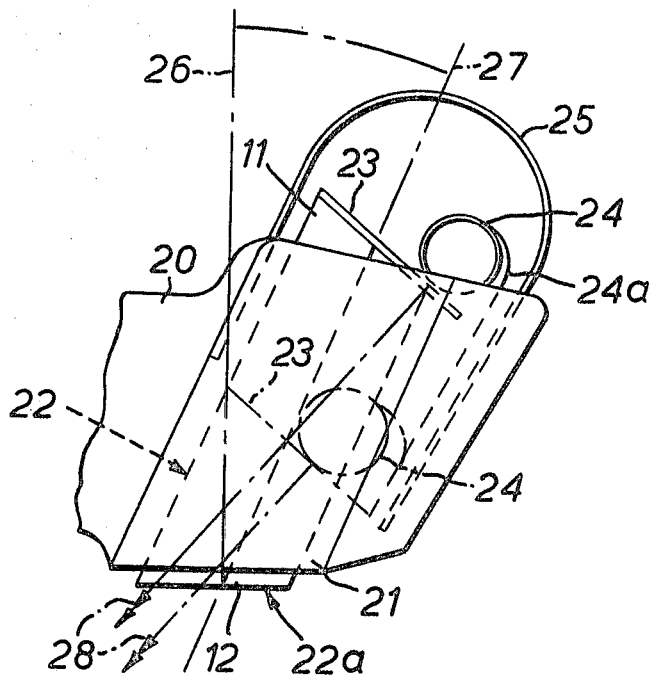
FIG. 3 shows an improved brush arrangement.

In the preferred form of brush arrangement of FIG. 3, the brush holder 20 has a brush box 21 receiving a brush 22 with pressure plate 23 and also receiving a recoiling constant pressure spring 24 and its mounting clip 25. The radial direction is indicated at 26, the lengthwise axis of the brush at 27 and the line of action of the force of the spring at 28.

The unwound end portion of the spring 24 is indicated at 24a and it will be seen to converge towards the axis 27 in a direction towards the contact surface 22a of the brush 22.

We claim:

1. In a brush arrangement for a dynamoelectric machine including a brush box having a brush locating surface, a split brush having an adjacent brush portion in contact with the locating surface and a remote brush portion against the adjacent brush portion, the split brush having a bevelled outer end, and a pressing device engaging the bevelled outer end of the split brush and urging it towards the locating surface; the improvement comprising a form of said split brush having the brush portions similarly bevelled and comprising a pressure plate secured on the bevelled outer end of the remote brush portion to be contacted by the pressing device, said plate having a first extension to overlie the bevelled outer end of the adjacent brush portion, and the plate also having a second extension which projects cantileverwise from the remote brush portion in a direction away from the adjacent brush portion.

2. A split brush according to claim 1, wherein the pressure plate is plane and there is an angle-section piece having a first limb rigidly secured to the pressure plate and a second limb rigidly secured to the remote brush portion.

3. A split brush according to claim 2, having a pad of elastomeric material between the first extension of the plate and the bevelled outer end of the adjacent brush portion.

4. A brush according to claim 1, said pressure plate having a zigzag shape, being rigidly secured to the remote brush portion and having oppositely directed and roughly parallel limbs overlying respectively the end of the adjacent brush portion and the remote brush portion, the limb overlying the remote brush portion having the cantilever extension.

5. A split brush according to claim 4, having a pad of elastomeric material between the adjacent brush portion and the overlying limb of the plate.

6. A split brush according to claim 1, having a pad of elastomeric material between said first extension and the bevelled outer end of the adjacent brush portion.

7. In a brush arrangement according to claim 1, the pressing device being of a self-recoiling constant-pressure spring-type, a construction of the brush box supporting the split brush with its lengthwise axis at an angle of about 22½° to the radius of the collector ring through the point of intersection of the lengthwise axis with the surface of the collector ring, said brush box further supporting the spring pressing device.

8. A brush arrangement according to claim 7, having an unwound end portion of the recoiling spring lying against a surface of the brush box which converges with the lengthwise axis of the brush in a direction towards the collector ring.